US009488862B2

(12) United States Patent
Doyle et al.

(10) Patent No.: US 9,488,862 B2
(45) Date of Patent: Nov. 8, 2016

(54) DISPLAYS WITH ORGANIC LIGHT-EMITTING DIODE BACKLIGHT STRUCTURES

(71) Applicant: Apple Inc., Cupertino, CA (US)

(72) Inventors: David A. Doyle, San Francisco, CA (US); Paul S. Drzaic, Morgan Hill, CA (US); Jean-Pierre S. Guillou, San Francisco, CA (US); Joshua G. Wurzel, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 227 days.

(21) Appl. No.: 13/765,656

(22) Filed: Feb. 12, 2013

(65) Prior Publication Data

US 2014/0226110 A1    Aug. 14, 2014

(51) Int. Cl.
 *G02F 1/1335* (2006.01)
(52) U.S. Cl.
 CPC ......... *G02F 1/133603* (2013.01); *G02F 2001/133624* (2013.01); *G02F 2202/28* (2013.01)
(58) Field of Classification Search
 CPC .............................................. G02F 1/133603
 USPC ........................................................ 349/69
 See application file for complete search history.

(56) References Cited

U.S. PATENT DOCUMENTS

| | | | |
|---|---|---|---|
| 6,025,894 A * | 2/2000 | Shirasaki | G02F 1/133555 349/61 |
| 6,542,145 B1 * | 4/2003 | Reisinger et al. | 345/102 |
| 8,179,034 B2 | 5/2012 | Potts et al. | |
| 2004/0109106 A1 * | 6/2004 | Yang et al. | 349/69 |
| 2005/0007517 A1 * | 1/2005 | Anandan | 349/69 |
| 2006/0109397 A1 * | 5/2006 | Anandan | G02F 1/133603 349/69 |
| 2006/0132668 A1 * | 6/2006 | Park et al. | 349/48 |
| 2006/0187378 A1 * | 8/2006 | Bong et al. | 349/69 |
| 2006/0238666 A1 * | 10/2006 | Ko et al. | 349/40 |
| 2008/0018244 A1 * | 1/2008 | Anandan | 313/511 |
| 2008/0129189 A1 * | 6/2008 | Cok | B82Y 20/00 313/503 |
| 2008/0137008 A1 * | 6/2008 | Rogojevic et al. | 349/69 |
| 2010/0134521 A1 | 6/2010 | Hente et al. | |
| 2010/0302132 A1 * | 12/2010 | Ito et al. | 345/87 |
| 2011/0019134 A1 * | 1/2011 | Lee | G02F 1/133516 349/106 |
| 2011/0273377 A1 * | 11/2011 | Merz | 345/173 |
| 2012/0104601 A1 * | 5/2012 | Badakere et al. | 257/737 |
| 2012/0182494 A1 | 7/2012 | Yu et al. | |
| 2012/0187431 A1 | 7/2012 | Bergmann et al. | |
| 2013/0027636 A1 * | 1/2013 | Marrocco et al. | 349/69 |
| 2013/0278545 A1 * | 10/2013 | Cok et al. | 345/174 |
| 2013/0285537 A1 * | 10/2013 | Chaji | 313/504 |

* cited by examiner

*Primary Examiner* — Ryan Crockett

(74) *Attorney, Agent, or Firm* — Treyz Law Group, P.C.; Zachary D. Hadd; Kendall P. Woodruff

(57) ABSTRACT

An electronic device may be provided with a display. The display may include a liquid crystal display cell and an organic light-emitting diode backlight unit. The liquid crystal display cell may include a color filter layer, a liquid crystal layer, and a thin-film transistor layer. The organic light-emitting diode backlight unit may include organic emissive material formed on a substrate. The organic emissive material may generate backlight for liquid crystal display cell. Display pixels in the liquid crystal display cell may control the emission of the backlight from the display. The organic light-emitting diode backlight unit may be attached to the display using adhesive, laminated to a polarizer layer of the display cell, or may be integrated into the liquid crystal display cell. The backlight unit may include conductive vias or bent extended edge portions for coupling the backlight unit to control circuitry.

28 Claims, 14 Drawing Sheets

DISPLAYS WITH ORGANIC LIGHT-EMITTING DIODE BACKLIGHT STRUCTURES

BACKGROUND

This relates generally to electronic devices, and more particularly, to electronic devices with displays.

Electronic devices often include displays. For example, cellular telephones and portable computers often include displays for presenting information to a user.

It can be challenging to form displays for electronic devices. Displays such as liquid crystal displays typically include backlight structures that include multiple light-emitting diodes that emit light into a light guide plate that distributes backlight for the display. Backlight generated by the backlight structures passes through electronically controlled liquid crystal material to generate images for presenting information to a user.

If care is not taken, backlight structures formed from light-emitting diodes and a light guide plate may be bulky. The housing of an electronic device can be adjusted to accommodate a bulky display with conventional backlight structures, but this can lead to undesirable enlargement of the size and weight of the housing and unappealing device aesthetics.

It would therefore be desirable to be able to provide improved displays for electronic devices.

SUMMARY

An electronic device may be provided with a display mounted within a housing. The display may include a liquid crystal display cell and a backlight unit that is formed from one or more organic light-emitting diodes. The liquid crystal display cell may include a color filter layer, a liquid crystal layer, a thin-film transistor layer, and one or more polarizer layers. The organic light-emitting diode backlight structures (OLED backlight structures) may provide backlight that illuminates the display layers.

The OLED backlight structures may be mounted in a chassis structure such as a plastic chassis that is attached to a liquid crystal display cell for the display. However, this is merely illustrative. If desired, the OLED backlight structures may be laminated to the liquid crystal display cell or the liquid crystal display cell may include integrated organic light-emitting diode backlight components. A polarizer layer for the display may be integrated onto the organic light-emitting diode backlight structures so that the OLED backlight structures generate polarized light that is provided to the liquid crystal display cell.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, 3, and 4.

Figure 1:
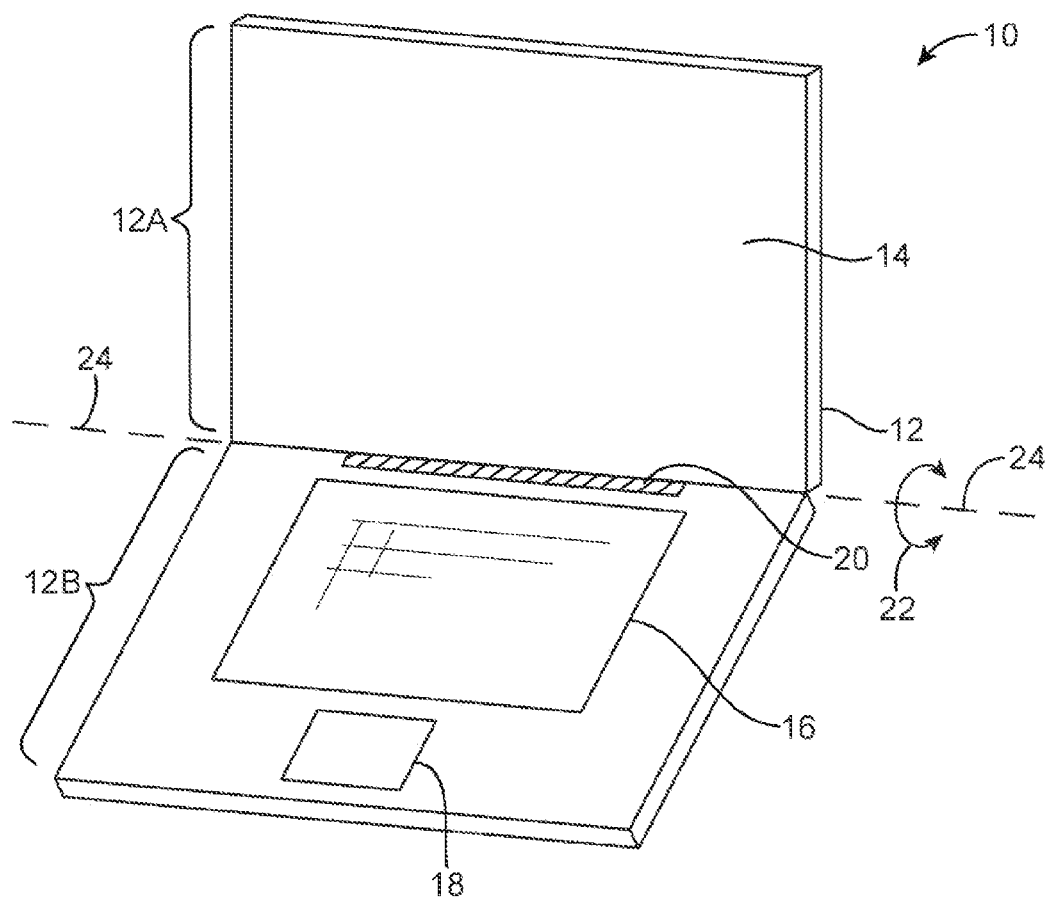
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
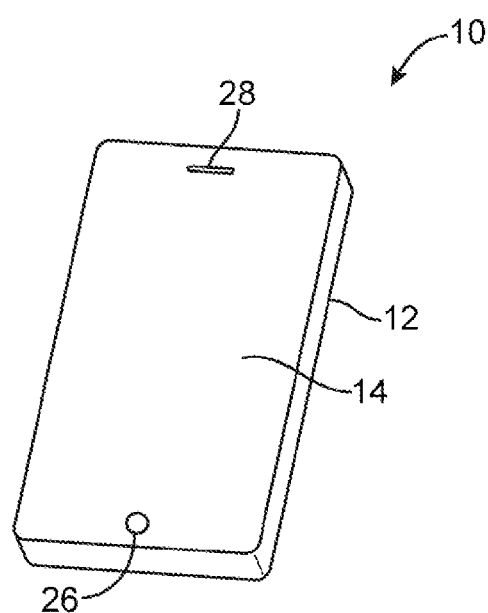
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
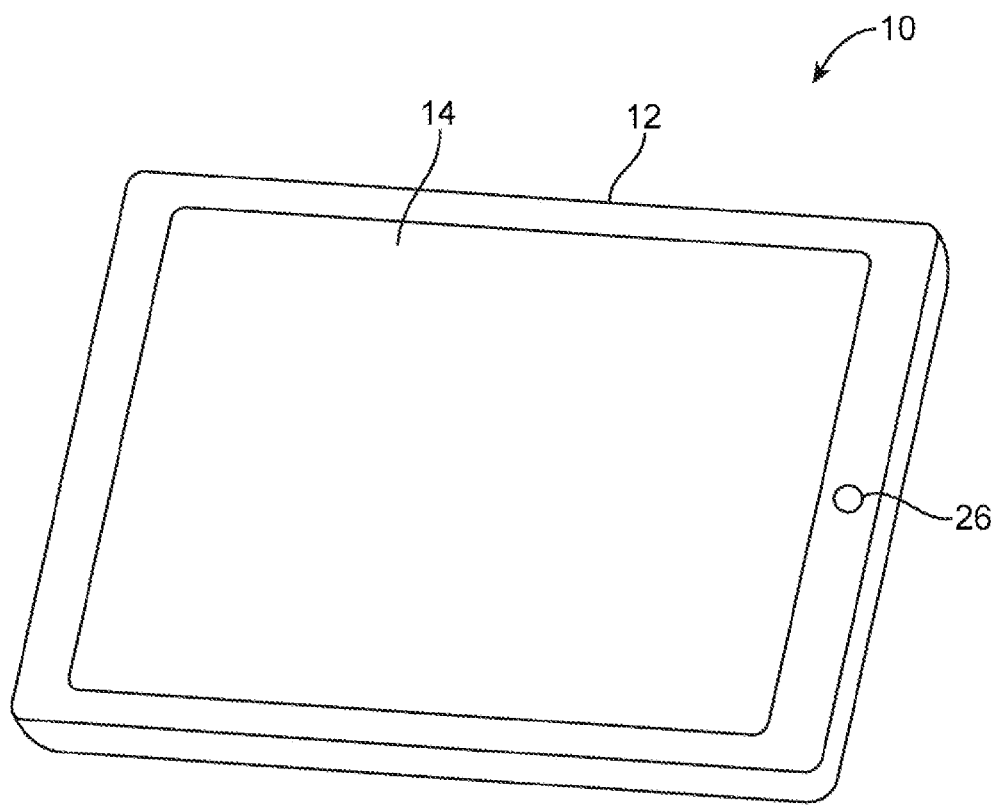
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
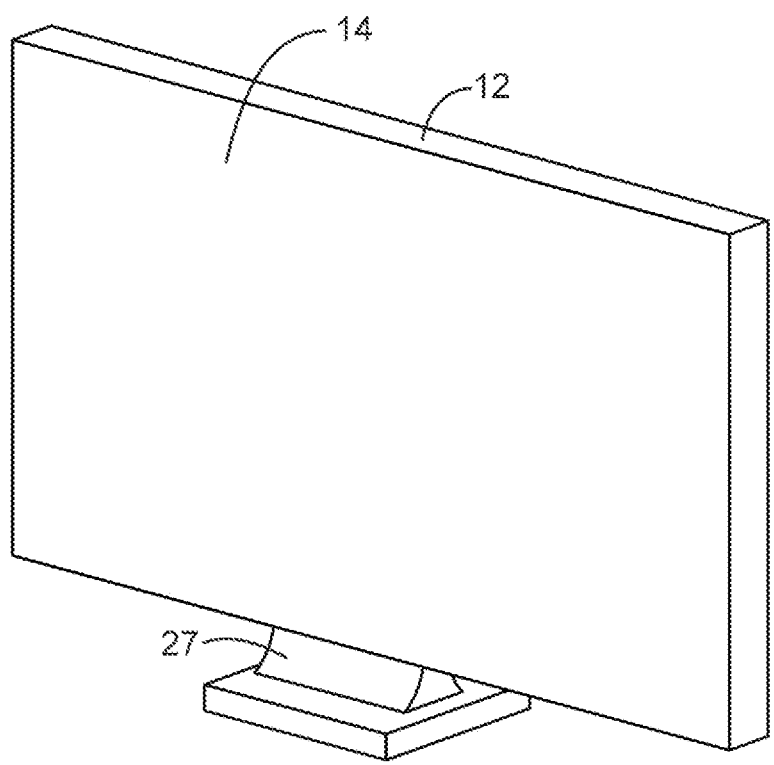
FIG. 4 is a perspective view of an illustrative electronic device such as a computer display with display structures in accordance with an embodiment of the present invention.

FIG. 4 shows how electronic device 10 may be a computer display or a computer that has been integrated into a computer display. With this type of arrangement, housing 12 for device 10 may be mounted on a support structure such as stand 27. Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may include display pixels formed from liquid crystal display (LCD) components and organic light-emitting diode backlight structures. A display cover layer may cover the surface of display 14 or a display layer such as a color filter layer, polarizer layer, or other portion of a display may be used as the outermost (or nearly outermost) layer in display 14. The outermost display layer may be formed from a transparent glass sheet, a clear plastic layer, or other transparent member.

Figure 5:
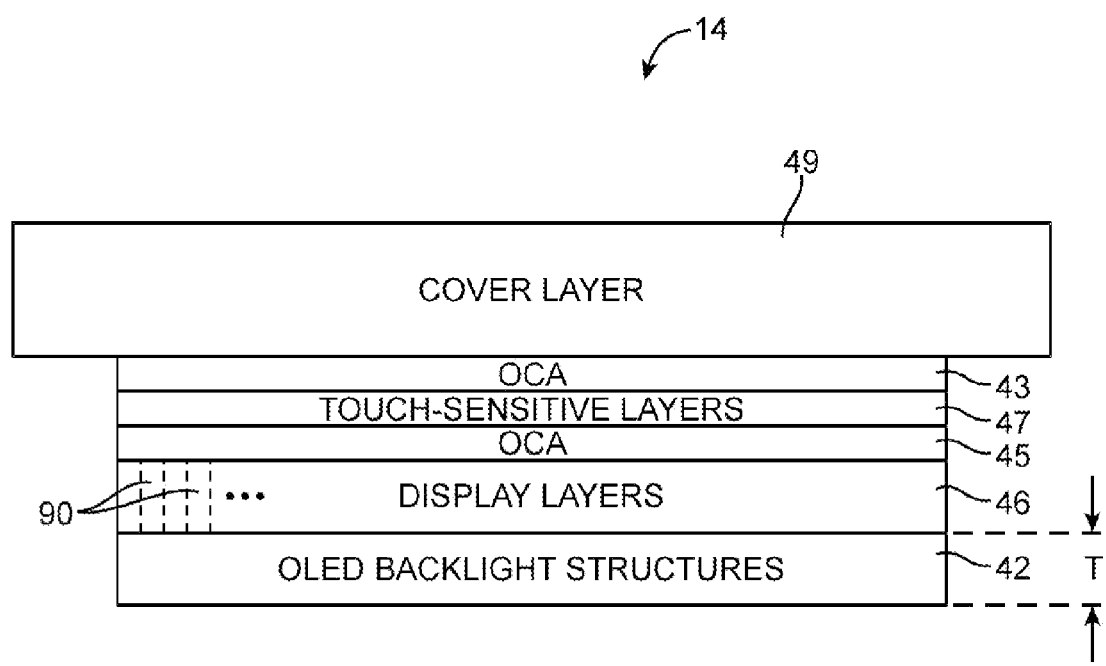
FIG. 5 is a cross-sectional side view of an illustrative display having organic light-emitting diode backlight structures in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include one or more layers of touch sensitive components such as touch-sensitive layers 47 that are attached to a cover layer such as cover layer 49. Cover layer 49 may be formed from a sheet of rigid or flexible transparent material such as glass or plastic.

Touch-sensitive layers 47 may be attached to cover layer 49 using an adhesive material such as optically clear adhesive (OCA) 43. Adhesive 43 may be a liquid adhesive, light-cured adhesive, pressure-sensitive adhesive or other suitable adhesive. Touch-sensitive layers 47 may include touch sensor components such as an array of capacitive touch sensor electrodes formed from transparent materials such as indium tin oxide.

Display 14 may include display layers such as layers 46 (e.g. a liquid crystal display cell) for generating images to be displayed on display 14. Display layers 46 may include polarizer layers, color filter layers, transistor layers, adhesive layers, layers of liquid crystal material, or other layers for generating display images. Display layers 46 may be attached to touch-sensitive layers 43 using adhesive such as optically clear adhesive 45. Adhesive 45 may be a liquid adhesive, light-cured adhesive, pressure-sensitive adhesive or other suitable adhesive.

Display layers 46 may selectively block and transmit light that has been generated by light-generating structures such as organic light-emitting diode (OLED) backlight structures 42 (sometimes referred to herein as OLED backlight structures, OLED backlight unit, backlight unit or backlight structures) to form images to be viewed by a user of device 10. OLED backlight structures 42 may include one, two, three, more than three, hundreds, thousands, hundreds of thousands, or more that hundreds of thousands of organic light-emitting elements formed from organic emissive material.

OLED backlight structures 42 may be attached to display layers 46 using an adhesive such as a pressure-sensitive adhesive that runs along one or more edges of structures 42, may be laminated to display layers 46 using an optically clear adhesive sheet between structures 42 and layers 46, or may be formed from organic light-emitting diode components that are integrated into display layers 46.

OLED backlight structures 42 may be rigid or flexible OLED backlight structures (e.g., structures 42 may be formed on a rigid substrate such as glass or a flexible substrate). Display 14 may have a substantially rectangular shape or may have other shapes (e.g., a circular, oblong, or other irregular shape). OLED backlight structures 42 may have a shape that corresponds to the shape of display layers 46.

OLED backlight structures 42 may have a thickness T that is substantially smaller than the thickness of a conventional LCD backlight unit. For example, thickness T of structures 42 may be between 150 microns and 200 microns, between 100 microns and 200 microns, less than 250 microns, or less than 650 microns (as examples).

Figure 6:
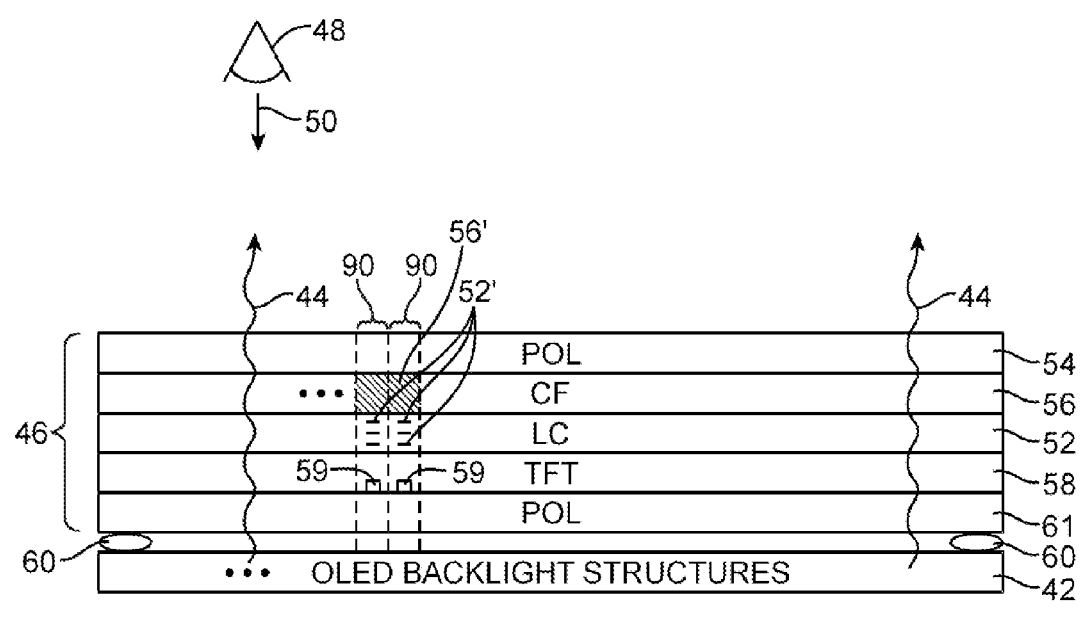
FIG. 6 is a cross-sectional side view of illustrative display layers and organic light-emitting diode backlight structures in accordance with an embodiment of the present invention.

A cross-sectional side view of an illustrative configuration that may be used for display layers 46 and OLED backlight structures 42 of display 14 (e.g., for display layers 46 and backlight structures 42 of FIG. 5, or other suitable display) is shown in FIG. 6. As shown in FIG. 6, OLED backlight structures 42 may be attached to display layers 46 using adhesive 60 (e.g., a pressure-sensitive adhesive, thermally cured adhesive, light-cured adhesive such as an ultra-violet light-cured adhesive, or other adhesive material) formed along one or more edges of structures 42. Adhesive 60 may run along an edge of an active layer of backlight structures 42 (e.g., a substrate layer, a polarizer layer, etc.) or along a support structure such as a chassis structure for backlight structures 42. In the example of FIG. 6, adhesive 60 attaches backlight structures 42 to a polarizer layer of display layers 46.

OLED backlight unit 42 may produce backlight 44. During operation of display 14, backlight 44 travels outwards (vertically upwards in dimension Z in the orientation of FIG. 6) and passes through display pixel structures 90 in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

Display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 61 and upper polarizer layer 54. If desired, upper polarizer layer 54 may be attached to an outer cover layer such as cover layer 49 (FIG. 5).

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements 56' for providing display 14 with the ability to display color images. Color filter elements 56' may each transmit light having a selected wavelength range around a peak transmission wavelength. For example, a red color filter element may transmit light have a range of wavelengths around a peak wavelength at or near 700 nanometers (nm). Color filter elements 56' may include red color filter elements, blue color filter elements, green color filter elements, cyan color filter elements, magenta color filter elements and/or yellow color filter elements (as examples). If desired, layer 58 may be a color filter layer and layer 56 may be a thin-film transistor layer.

During operation of display 14 in device 10, control circuitry for device 10 (e.g., one or more integrated circuits on a printed circuit) may be used to generate information to be displayed on display 14 (e.g., display data). The information to be displayed may be conveyed from the control circuitry to a display driver integrated circuit (e.g., a display driver integrated circuit mounted on TFT layer 58) for the display using a signal path such as a signal path formed from conductive metal traces in one or more flexible printed circuits. The display signals may be routed to electrodes on thin-film transistor layer 58 and/or to OLED backlight structures 42. OLED backlight structures 42 may receive control signals directly from control circuitry or may receive control signals that are routed to OLED backlight structures 42 through a portion of display layers 46.

Control signals provided to backlight structures 42 may turn on, turn off, increase brightness, decrease brightness, or otherwise adjust backlight 44 from some or all of backlight structures 42. Backlight 44 passes through polarizer 61 and TFT layer 58 onto liquid crystal material 52.

Control signals provided to display layers 46 may be used to operate electrodes 59 located on thin-film transistor layer 58. Electrodes 59 may generate electric fields in liquid crystal material 52 that control the orientation of liquid crystals 52' in liquid crystal layer 52. In this way, liquid crystals 52' may be rotated to selectively block and/or transmit various amounts of backlight 44 through each pixel 90.

OLED backlight structures 42 may include organic-light-emitting diodes that generate polarized light to be provided to display layers 46. In configurations in which OLED backlight structures include polarized light-emitting-diodes of this type, display layers 46 may be provided without a lower polarizer.

OLED backlight structures 42 may include color organic-light-emitting diodes that generate colored light to be provided to display layers 46. In configurations in which OLED backlight structures include colored light-emitting-diodes of this type, display layers 46 may be provided without any color filter layer. However, this is merely illustrative. If desired, OLED backlight structures 42 may include colored light-emitting diodes that emit colors of light that are matched to the transmission spectra of the color filter elements in color filter layer 56. For example, backlight structures 42 may generate backlight 44 having a continuous spectrum of colors in the visible range with one or more emission peaks at wavelengths corresponding to peak transmission wavelengths of the color filter elements. In this way, the power consumption of display 14 may be reduced by effectively reducing the amount of light that is generated by backlight structures 42 and absorbed by color filter layer 56.

If desired, OLED backlight structures 42 may include colored light-emitting diodes that, in combination, generate white backlight for display 14 that has a color temperature that is matched to the color temperature of a desired white point for the display (e.g., the white points of the D55, D65, D75, F3, or other standard illuminants of the International Commission on Illumination (CIE)).

Figure 7:
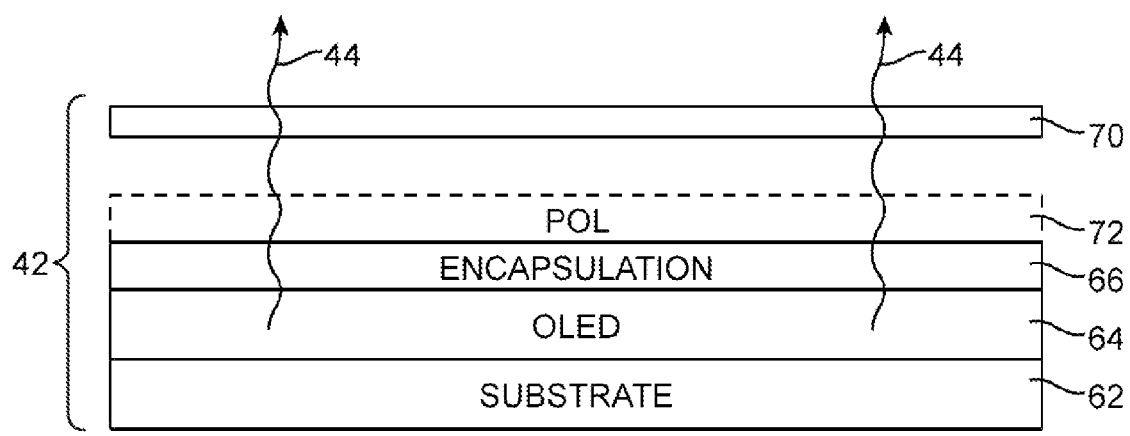
FIG. 7 is a cross-sectional side view of illustrative top-emission organic light-emitting diode backlight structures in accordance with an embodiment of the present invention.

FIG. 7 is a cross-sectional view of OLED backlight structures 42 that are implemented in a top-emission configuration. In a configuration for display 14 of the type shown in FIG. 7, OLED backlight structures 42 include a substrate layer such as substrate layer 62. Substrate layer 62 may be a polyimide layer that is temporarily carried on a glass carrier during manufacturing or may be a layer formed from glass or other suitable substrate materials.

Organic light-emitting diode (OLED) layer 64 is formed on an upper surface of substrate 62. An encapsulation layer such as encapsulation layer 66 encapsulates organic light-emitting diode layer 64. During operation, one or more individually controlled backlight pixels in organic light-emitting diode layer 64 generate backlight 44 to be provided to display layers 46.

Structures 42 may include one or more polarizer layers such as polarizer layer 72. Layer 72 may include a circular polarizer that suppresses reflections from metal signal lines in layer 64. If desired, polarizer layer 61 of FIG. 6 may be incorporated into polarizer layer 72 of OLED backlight structures 42. In this way, OLED backlight structures 42 may provide polarized light to display layers 46.

Organic light-emitting diode layer 64 may contain one or more thin-film transistors. The thin-film transistors may be formed from semiconductors such as amorphous silicon, polysilicon, or compound semiconductors (as examples). Signal lines (e.g., a grid of horizontal and vertical metal lines) may be used in applying control signals to the thin-film transistors. During operation, signals are applied to one or more organic light-emitting diodes in layer 64 using the signal lines so that backlight structures 42 generate backlight 44 of desired intensity and spatial distribution to be provided to the pixel structures (e.g., pixels 90 of FIG. 5) of display layers 46.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Display 14 may include other light diffusing features such as a roughened surface of a substrate layer of structures 42, diffusive material in an adhesive that attaches polarizer 61 to TFT layer 58, or a light diffusing adhesive that attaches structures 42 to display layers 46.

Figure 8:
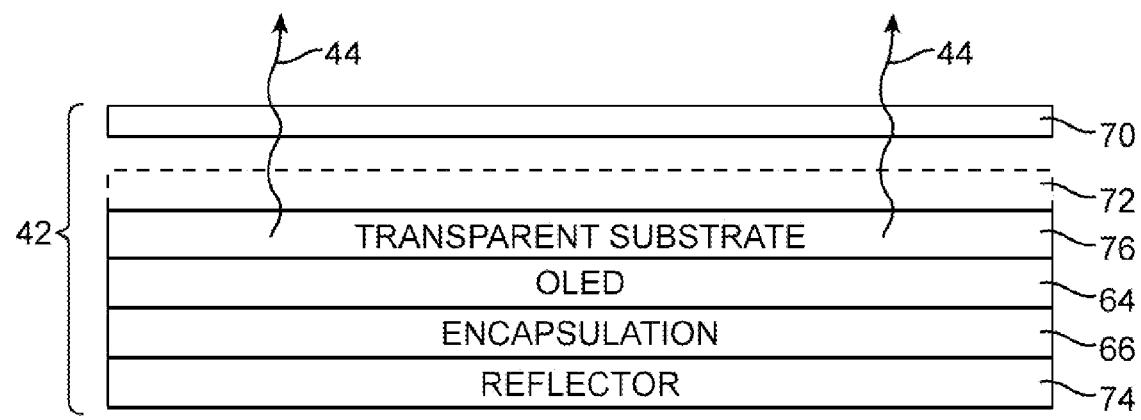
FIG. 8 is a cross-sectional side view of illustrative bottom-emission organic light-emitting backlight structures in accordance with an embodiment of the present invention.

In a configuration for display 14 of the type shown in FIG. 8, OLED backlight structures 42 are implemented in a bottom-emission arrangement. As shown in FIG. 8, OLED backlight structures 42 may include a transparent substrate layer such as glass layer 76. A layer of organic light-emitting diode structures such as organic light-emitting diode layer 64 may be formed on the underside of glass layer 76. An encapsulation layer such as encapsulation layer 66 may be used to encapsulate organic light-emitting diode layer 64.

Encapsulation layer 66 may be formed from a layer of metal foil, metal foil covered with plastic, other metal structures, a glass layer, a thin-film encapsulation layer formed from a material such as silicon nitride, a layered stack of alternating polymer and ceramic materials, or other suitable material for encapsulating organic light-emitting diode layer 64. Encapsulation layer 66 may help protect organic light-emitting diode layer 64 from environmental exposure by preventing water and oxygen from reaching organic emissive materials within organic light-emitting diode layer 64.

Backlight 44 of desired intensity and spatial distribution from organic light-emitting diode layer 64 may be emitted upwards through transparent glass layer 76 to be provided to the pixel structures (e.g., pixels 90 of FIG. 5) of display layer 46. Backlight structures 42 may include a reflective layer such as reflector 74. Reflector 74 may be attached to encapsulation layer 66 and may reflect light from layer 64 that has been emitted downward toward reflector 74 back upward to be used as backlight for display layers 46.

Organic light-emitting diode backlight structures 42 may include a single OLED pixel, two OLED pixels, more than two OLED backlight pixels, between one and one hundred OLED backlight pixels, thousands of OLED backlight pixels, hundreds of thousands of OLED backlight pixels, millions of OLED backlight pixels or any other suitable number of OLED backlight pixels. OLED backlight pixels of structures 42 may be operated independently or in unison.

Figure 9:
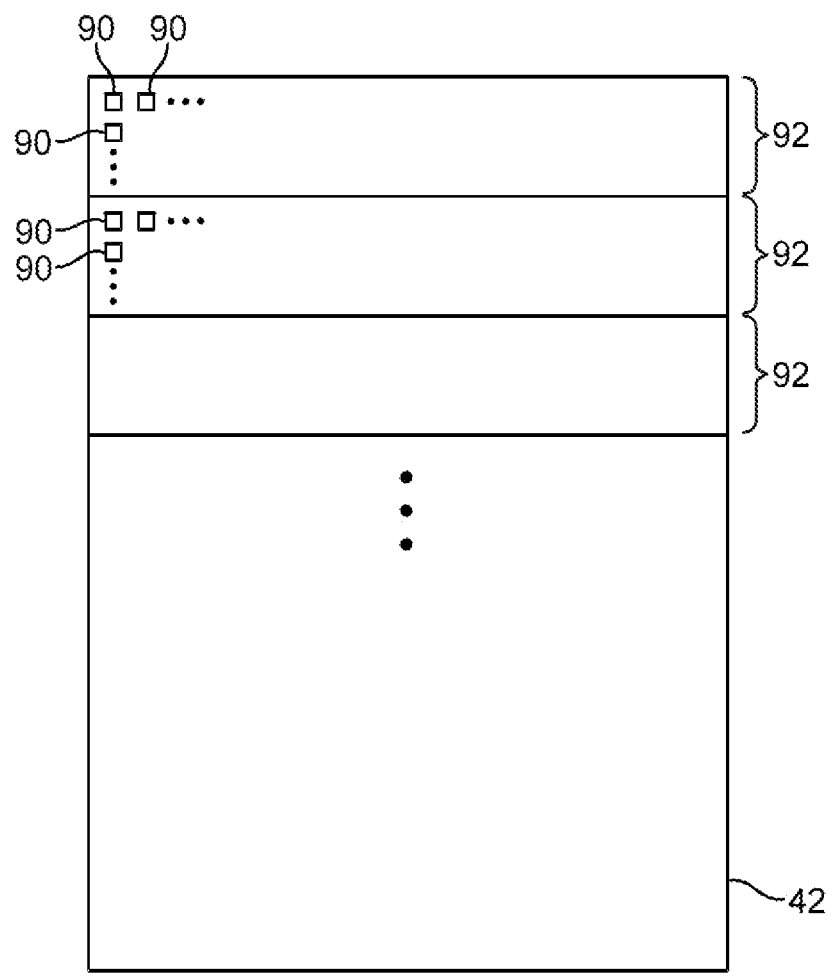
FIG. 9 is a top view of illustrative organic light-emitting diode backlight structures showing how the organic light-emitting diode backlight structures may be horizontally segmented in accordance with an embodiment of the present invention.

FIG. 9 is a top view of backlight structures 42 showing how structures 42 may form a segmented OLED backlight unit having horizontal backlight pixels 92. Each horizontal backlight pixel 92 may provide backlight to one or more rows of display pixels 90. In this way, the intensity of backlight that is provided to display layers 46 may be varied horizontally. Each display pixel 90 may control how much of the backlight that is provided by a horizontal backlight pixel 92 is released from the display for viewing by a user. However, the horizontal backlight pixels of FIG. 9 are merely illustrative. If desired, other distributions of backlight pixels may be provided.

Figure 10:
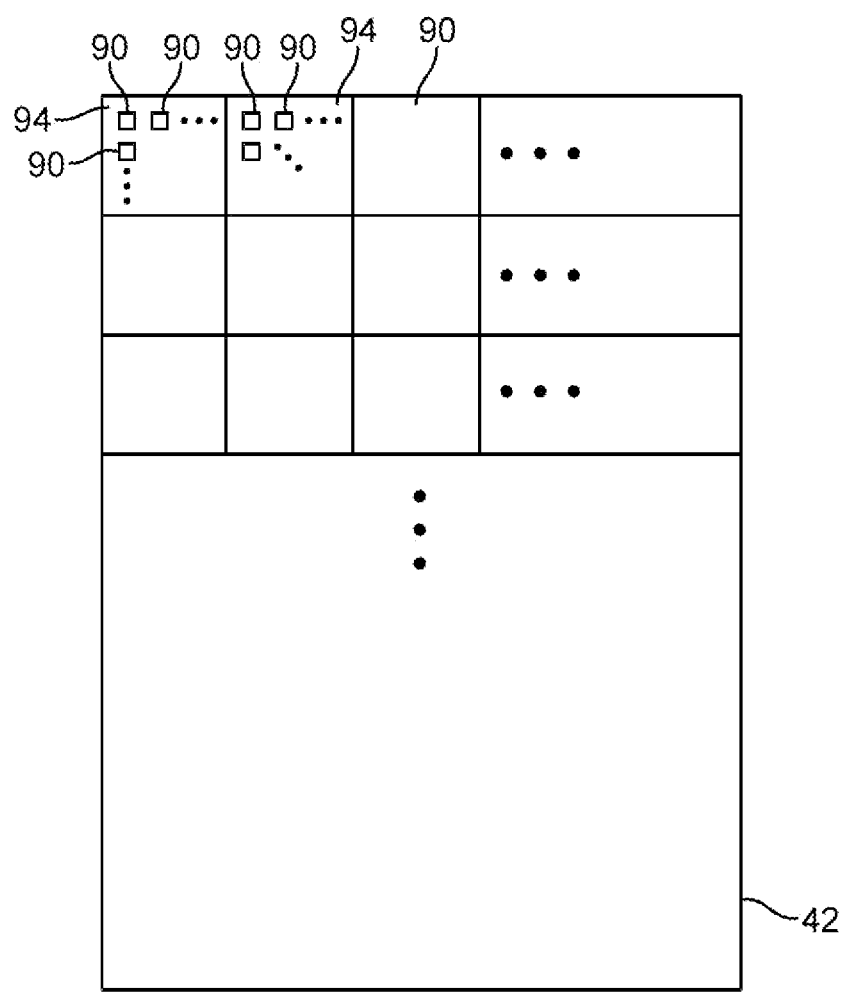
FIG. 10 is a top view of illustrative organic light-emitting diode backlight structures showing how the organic light-emitting diode backlight structures may be horizontally and vertically segmented in accordance with an embodiment of the present invention.

As shown in FIG. 10, structures 42 may be horizontally and vertically segmented using backlight pixels such as backlight pixels 94. Each backlight pixel 94 may provide backlight to one or more display pixels 90. If desired, a backlight pixel 94 may provide backlight to a single corresponding display pixel 90, to multiple display pixels 90, a subarray of display pixels 90, or any suitable number of display pixels 90. In this way, portions of the display that are used for displaying bright objects may be provided with bright backlight while portions of the display that are used to display dark objects such as black portions of an image may be provided with little or no backlight. Each display pixel 90 may control how much of the backlight that is provided by a backlight pixel 94 is released from the display for viewing by a user.

Each backlight pixel 94 may include one or more backlight sub-pixels that each generate light of a desired color. For example, each backlight pixel 94 may include a red backlight sub-pixel, a green backlight sub-pixel, a blue backlight sub-pixel, or other backlight sub-pixels. Backlight sub-pixels may each emit light having a wavelength range that corresponds to the range of transmitted wavelengths of a corresponding color filter element 56' of color filter layer 56 of display layers 46. Each backlight pixel 94 may include backlight sub-pixels having colors that, in combination, generate white light corresponding to a desired display white point or display light color temperature.

Individual backlight pixels such as pixels 92 or 94 may be controlled using directly driven (sequentially patterned) electrodes, vias from additional control circuitry to the electrodes, passively addressed rows and columns of electrodes or using active matrix technologies (as examples).

Figure 11:
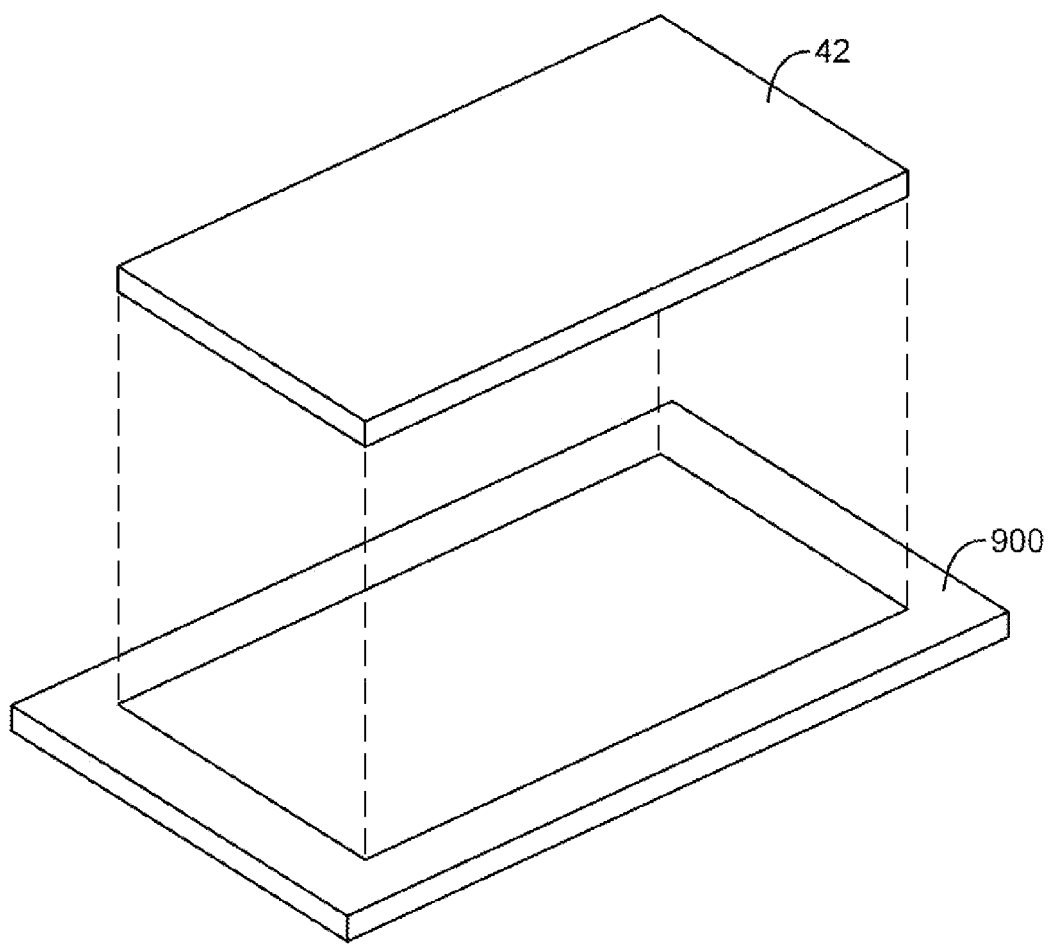
FIG. 11 is a perspective view of illustrative organic light-emitting diode backlight structures and a corresponding chassis structure in accordance with an embodiment of the present invention.

OLED backlight structures 42 may be mounted in a support structure such as chassis structure 900 of FIG. 11. Chassis structure 900 may be formed from a ring of plastic or other suitable material that surrounds structures 42 and that serves as an interface between structures 42 and other portions of display 14 and/or surrounding portions of housing 12. If desired, chassis structure 900 may be formed from a plate of material that includes a rectangular recess to accommodate display structures such as structures 42. Chassis structure 900 may be formed from housing structures (e.g., as part of a housing frame, part of a unibody housing such as a metal housing, etc.). The arrangement of FIG. 11 in which chassis structure 900 surrounds OLED backlight structures 42 is merely illustrative. If desired, chassis structure 900 may only partially surround structures 42.

Chassis structure 900 may be a plastic display chassis structure (sometimes referred to as a p-chassis). Chassis structure 900 may be used in supporting the layers and structures of display 14 such as OLED backlight structures 42. If desired, other support structures such as a metal chassis structure (sometimes referred to as an m-chassis) may be used in supporting display 14.

Chassis structure 900 may be formed from materials such as polycarbonate or may be formed from other suitable materials (e.g., other suitable thermoplastic polymers or plastics). Chassis structure 900 may be molded (e.g., using an injection molding process or other suitable molding process), machined, thermoformed, or may be formed using any other suitable fabrication process. This is, however, merely illustrative. If desired, chassis structure 900 may be formed from glass, ceramic, other materials, or a combination of these materials.

Chassis structure 900 may be attached to display layers 46 using, for example, adhesive 60 of FIG. 6 that is interposed between an edge of chassis structure 900 and display layers 46.

Figure 12:
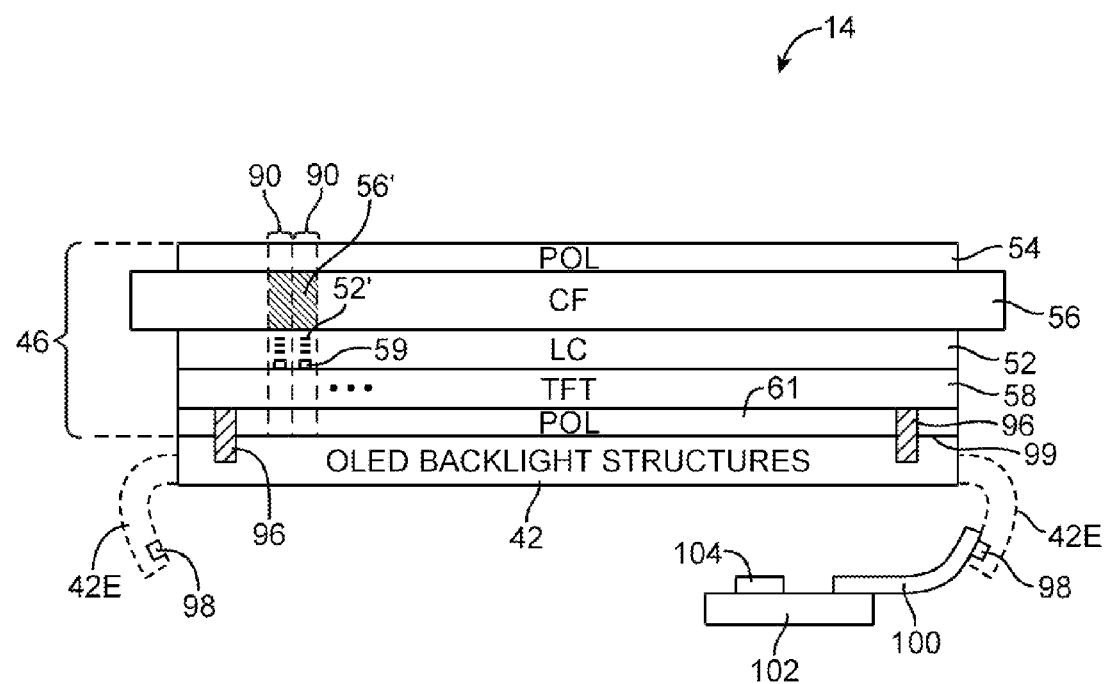
FIG. 12 is a cross-sectional side view of illustrative display layers and organic light-emitting backlight structures showing how the organic light-emitting diode structures may be laminated to the display layers in accordance with an embodiment of the present invention.

FIG. 12 is a cross-sectional view of display layers 46 and OLED backlight structures 42 showing how backlight structures 42 may be laminated to polarizer layer 61 of display layers 46. In a configuration of the type shown in FIG. 12, backlight structures 42 may be attached to polarizer layer 61 using a layer of optically clear adhesive such as adhesive layer 99. Backlight structures 42 may be provided with one or more conductive vias such as vias 96 that couple circuitry in backlight structures 42 to circuitry in thin-film transistor layer 58. In this type of configuration, backlight structures 42 may receive control signals from TFT layer 58. However, this is merely illustrative. If desired, OLED backlight structures 42 may include extended edge portions 42E that extend beyond the edge of display layers 46.

Extended edge portions 42E may be formed from a flexible substrate portion of OLED backlight structures 42. Extended edge portions 42E may be bent away from the plane defined by the central portion of display 14. Extended edge portions 42E may include conductive contacts 98. Contacts 98 may be coupled to additional circuitry in device 10. For example, portions 42E may be used to couple backlight structures 42 to one or more integrated circuits such as components 104 on printed circuit 102.

Signals for controlling OLED backlight pixels (e.g., backlight pixels 92 of FIG. 9 or backlight pixels 94 of FIG. 10) may be conveyed from circuitry 104 to OLED backlight structures 42 using a signal path such as a signal path formed from conductive metal traces in flexible printed circuit 100 (as an example). However, this is merely illustrative. If desired, flexible printed circuit 100 may be used in routing signals between printed circuit 102 and thin-film transistor layer 58. If desired, display 14 may include a driver integrated circuit mounted on printed circuit 102 or flexible printed circuit 100.

Printed circuit 102 may be formed from a rigid printed circuit board (e.g., a layer of fiberglass-filled epoxy) or a flexible printed circuit (e.g., a flexible sheet of polyimide or other flexible polymer layer). However, these examples are merely illustrative. If desired printed circuits 100 and 102 may be formed from a combination of rigid and flexible printed circuit layers (e.g., printed circuit 102 may be formed from a rigid printed circuit board with a layer of flexible printed circuitry that extends from an edge of printed circuit 102 to form flexible printed circuitry 100 that attaches to thin-film transistor layer 58). Control circuitry such as printed circuit 102 and integrated circuit 104 may be coupled to display layers 46 and/or backlight structures 42 in any suitable configuration.

Figure 13:
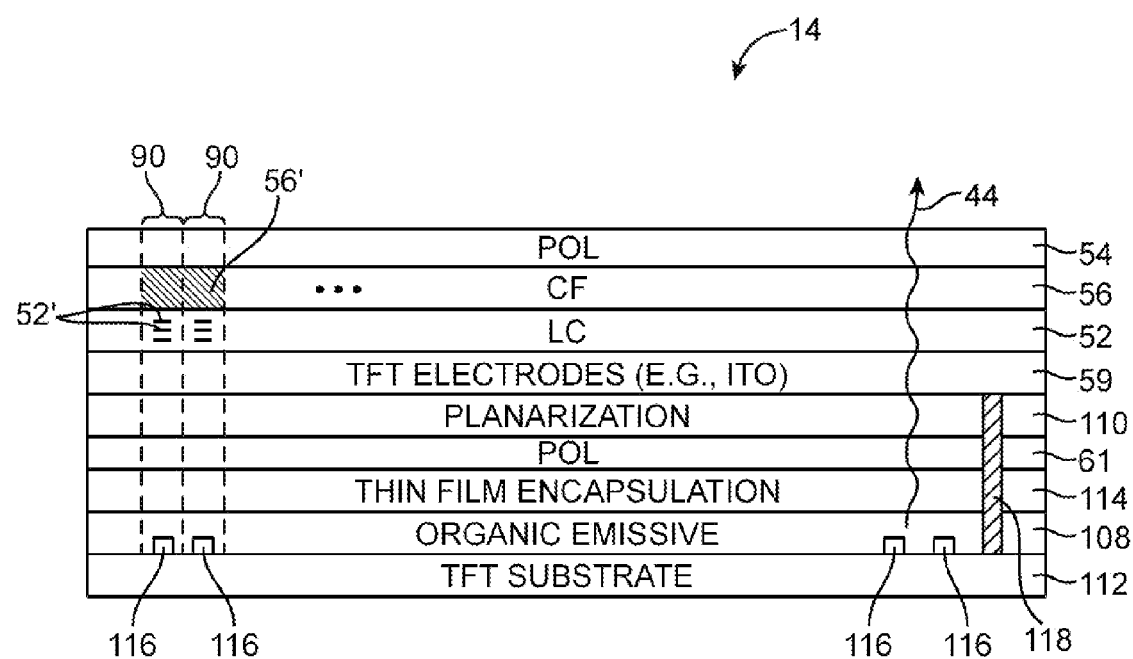
FIG. 13 is a cross-sectional side view of illustrative display layers and organic light-emitting backlight structures showing how the organic light-emitting diode structures may be integrated into the display layers in accordance with an embodiment of the present invention.

FIG. 13 is a cross-sectional view of display 14 showing how organic light-emitting diode backlight components may be integrated into the layers of a liquid crystal display. As shown in FIG. 13, display 14 may include a substrate such as thin-film-transistor substrate 112 (e.g., a glass substrate). Organic emissive material 108 may be formed on substrate 112. Organic emissive material may be covered by an encapsulant such as thin-film encapsulation layer 114. Organic emissive material 108 may be formed from organic plastics such as polyfluorene, a phosphorescent material, or other organic emissive materials. A planarization layer such as planarization layer 110 may be formed over thin-film encapsulation layer 114.

If desired, thin-film-transistor electrodes 59 may be formed between planarization layer 110 and encapsulation layer 114. Encapsulation layer 114 may be formed from a glass layer, a thin-film encapsulation layer formed from a material such as silicon nitride, a layered stack of alternating polymer and ceramic materials, or other suitable material for encapsulating organic emissive material 108.

If desired, a light polarizing layer such as polarizer layer 61 may be formed between encapsulation layer 114 and planarization layer 110. However, this is merely illustrative. Polarizer 61 may be formed above planarization layer 110 or in another position in display 14 that allows layer 61 to polarize light emitted from organic emissive material 108 before the light reaches liquid crystal layer 52. In an integrated configuration of the type shown in FIG. 13, polarizer 61 may be implemented as a wire-grid polarizer with periodic wire structures having a size and a relative separation that are associated with the wavelength of light emitted by emissive material 108.

An array of thin-film-transistor electrodes 59 (e.g., electrodes formed from indium tin oxide (ITO), a conductive polymer, or other transparent conductive material) may be formed over planarization layer 110. Liquid crystal layer 52 may be formed over TFT electrodes 59 so that electric fields generated by electrodes 59 control the orientation of liquid crystals 52', thereby controlling the amount of backlight 44 that exits display 14. Display 14 may include one or more conductive vias such as via 118 that route signals between TFT electrodes 59 and conductive structures on TFT substrate 112.

Display 14 may include circuitry such as thin-film-transistors and associated electrodes 116 on TFT substrate 112. Electrodes 116 may be operated by control circuitry for device 10 (e.g., printed circuit 102 and integrated circuit 104 of FIG. 12) to control emission of backlight 44 that is received from organic emissive material 108. Display 14 may include one electrode 116 associated with each display pixel 90 each electrode 116 may control the emission of backlight 44 for multiple pixels 90.

Figure 14:
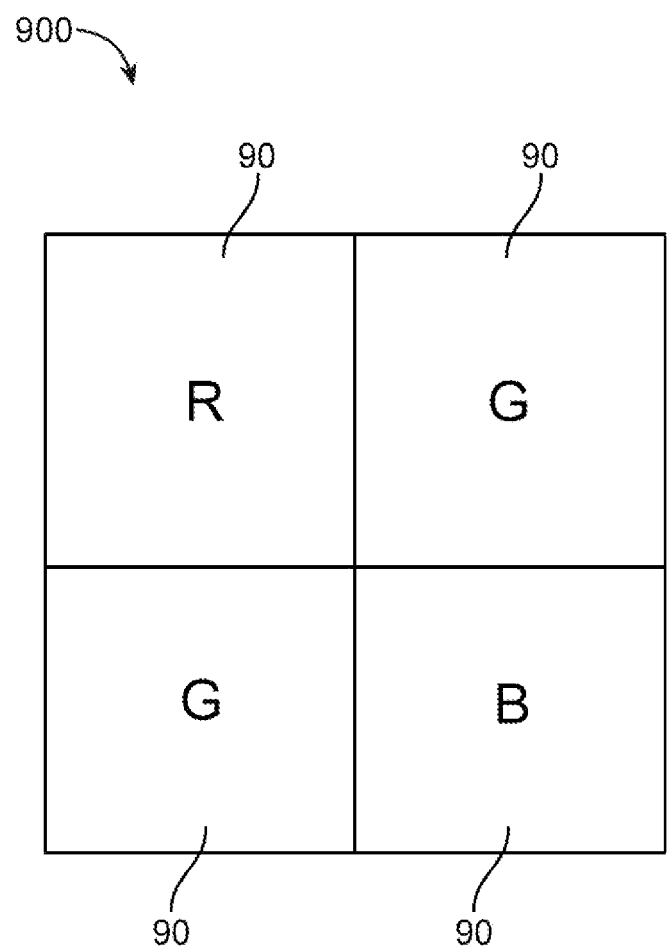
FIG. 14 is a top view of a portion of an illustrative display having an array of color display pixels in accordance with an embodiment of the present invention.

FIG. 14 is top view of a portion of display 14 showing how display pixels 90 may be combined to form a display pixel group for generating display light of a desired color. In the example of FIG. 14, display pixel group 900 includes four display pixels 90 (e.g., a red display pixel having a red color filter element, a blue display pixel having a red color filter element, and two green display pixels each having a green color filter element). Display pixels 90 of each pixel group 900 may be illuminated at various intensities to generate light of a desired color that is a combination of the colors of pixels (e.g., violet light or white light). In some scenarios, pixel groups 900 may be referred to as display pixels having display sub-pixels 90.

The arrangement of FIG. 14 is merely illustrative. If desired, display 14 may include three pixels 90 per pixel group 900, four pixels 90 per pixel group 900, two pixels 90 per pixel group 900, or more than four pixels 90 per pixel group 900. In configurations of the type shown in FIG. 14 in which a pixel group includes four pixels 90, the second green pixel can be replaced by a clear aperture (e.g., a pixel with a clear color filter element or no color filter element) or a pixel of a color other than red, green, or blue, such as yellow, cyan, or magenta. The fourth pixel may be a full color pixel or a color pixel having a color filter element with a reduced pigment in comparison with other color pixels.

This type of reduced pigment pixel may help adjust the color of white light emitted by the display.

Display light having a wide range of colors can be produced by display 14 by generating white light using OLED backlight structures 42 and using liquid crystals 52' (FIG. 6) to vary the amount of that white light that is transmitted through the various pixels 90 in each pixel group.

In many display applications, it may be desirable to generate white display light. However, display light that appears white to the human eye may be composed of various combination of colored light (i.e., various spectral distributions of light appear white to the human eye). The spectrum of white light is often characterized by a "color temperature" or "white point", which distinguishes these various white colors. For example, a "warm" white emits more red light than a "cool" white, which emits more blue light. Some display standards mandate or recommend the use of specific color temperatures or white points for white light.

The white point for display 14 may be controlled by using liquid crystals 52' to set the balance of emitted light from red, green, and blue pixels 90 of each pixel group 900. However, in order to improve the efficiency of display 14, the materials and/or formation of OLED backlight structures 42 may be configured to emit backlight that is closely matched to the desired white point of the display.

Figure 15:
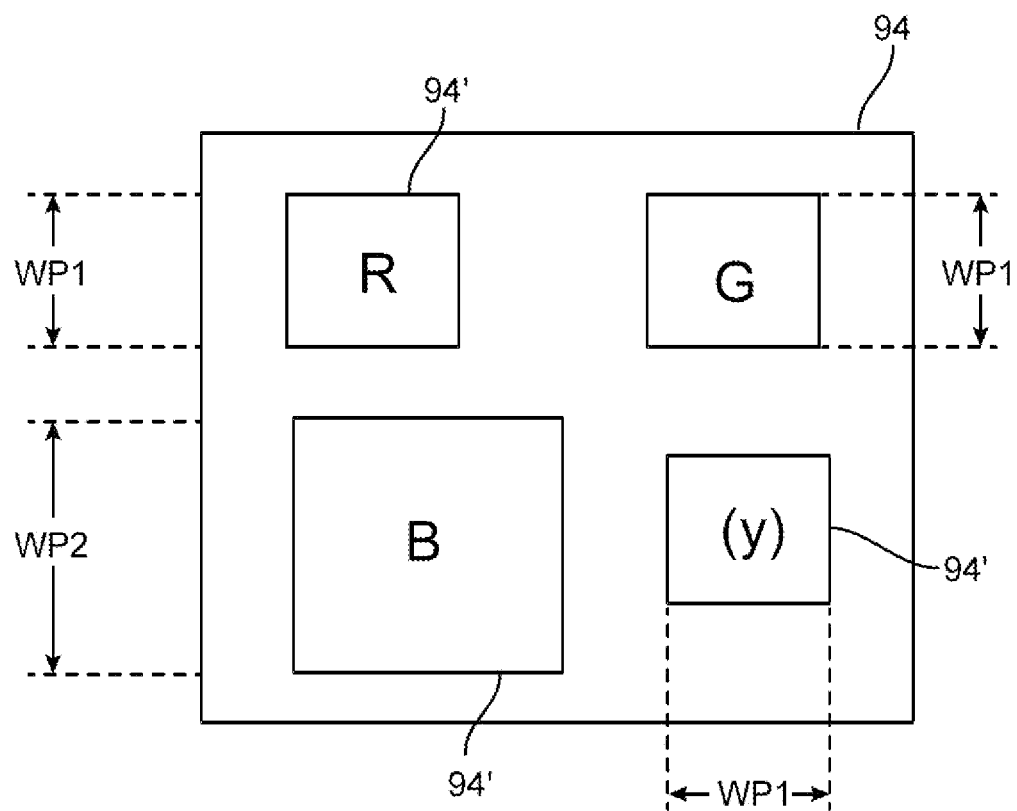
FIG. 15 is a top view of a portion of illustrative organic light-emitting diode backlight structures showing how each backlight pixel may include multiple backlight sub-pixels in accordance with an embodiment of the present invention.

As shown in FIG. 15, OLED backlight pixels 94 that produce backlight such as white backlight for display 14 may include multiple emitting components 94' (sometimes referred to as backlight sub-pixels 94') that individually emit red, green, blue, or other colors (e.g., yellow), so that, in combination, all the emitters 94' produce a white light. By controlling the relative intensity of light generated by each emitter 94', the color temperature of each backlight pixel 94 can be tuned to match the color temperature associated with a desired display white point such as the D65 white point (e.g., a display white point corresponding to a color temperature of near 6500 K (degrees Kelvin)).

In this way, the overall power consumed by the backlight may be reduced because liquid crystals 52' can block little or no light from the backlight to generate light of the appropriate white point. To maximize the efficiency of the display, the color temperature of backlight emitted by OLED backlight structures 42 may be within 1500 K, within 500 K, within 250 K, within 100 K, or within 50 K of the color temperature of the desired display white point (as examples). For example, for a D65 white point, the backlight color temperature may be between 5000K and 8000 K, between 6000 K and 7000 K, or between 6250 K and 6750 K (as examples).

If desired, the relative intensities of light generated by backlight sub-pixels 94' can be adjusted to generate white backlight having a spectrum with emission peaks at desired wavelengths. For example, OLED backlight structures 42 may be configured to emit white light having emission peaks at emission peak wavelengths corresponding to transmission peak wavelengths in the transmission spectra of display color filter elements 56' (see, e.g., FIG. 6). In this way, the efficiency of display 14 may be improved because most or all of the backlight will be transmitted by the color filter elements.

White light generated using backlight sub-pixels 94' may, for example, have a red emission peak, a blue emission peak, and a green emission peak. As examples, one or more of the emission peak wavelengths may be within 30 nm, within 20 nm, within 10 nm, within 5 nm, or within one nm of the transmission peak wavelength of a corresponding color filter element.

As shown in FIG. 15, each backlight sub-pixel 94' may have a characteristic size such widths WP1 and WP2. The characteristic size of each backlight sub-pixel 94' in a backlight pixel 94 may be the same as, or different than, the characteristic size of other sub-pixels in each backlight pixel 94.

In the example of FIG. 15, the blue backlight sub-pixel has a characteristic size (e.g., width WP2) that is larger than the characteristic size (e.g., widths WP1) of backlight sub-pixels 94' of other colors. In this way, a lower backlight luminance level and power may be required for generating images that include blue light. This type of arrangement may help reduce the power requirements and undesired heating of the OLED backlight structures that can reduce the lifetime of an OLED emitter.

The example of FIG. 15 in which the blue backlight sub-pixel is larger than the red, green, and yellow backlight sub-pixels is merely illustrative. If desired, a backlight sub-pixel of any color may be provided with a larger or smaller area to increase the efficiency of the display.

The foregoing is merely illustrative of the principles of this invention and various modifications can be made by those skilled in the art without departing from the scope and spirit of the invention.

What is claimed is:

1. A display, comprising:
   organic light-emitting diode backlight structures that generate backlight for the display;
   display layers that include a layer of liquid crystal material that controls emission of the backlight from the display;
   a polarizer layer that forms a layer of the organic light-emitting diode backlight structures, wherein the polarizer layer includes a circular polarizer and at least one additional polarizer, wherein the display layers comprise a display substrate interposed between the polarizer layer and the layer of liquid crystal material; and
   at least one optical film interposed between the display substrate and the polarizer layer.

2. The display defined in claim 1 wherein the organic light-emitting diode backlight structures are attached to the display layers by an adhesive that runs along at least one edge of the display.

3. The display defined in claim 2 wherein the adhesive comprises pressure-sensitive adhesive.

4. The display defined in claim 1 wherein the display layers further comprise:
   a thin-film-transistor layer; and
   a color filter layer, wherein the layer of liquid crystal material is interposed between the thin-film-transistor layer and the color filter layer.

5. The display defined in claim 4 wherein the polarizer layer is attached to the thin-film-transistor layer.

6. The display defined in claim 1, further comprising a chassis structure, wherein the organic light-emitting diode backlight structures are mounted to the chassis structure.

7. The display defined in claim 6 wherein the organic light-emitting diode backlight structures are attached to the display layers by an adhesive that runs along at least one edge of the chassis structure.

8. The display defined in claim 1 wherein the organic light-emitting diode backlight structures comprise a segmented organic light-emitting diode backlight unit.

9. The display defined in claim 8 wherein the segmented organic light-emitting diode backlight unit comprises between one and one hundred organic-light-emitting diode backlight pixels.

10. The display defined in claim 9 wherein each of the organic light emitting diode backlight pixels generates backlight for a plurality of display pixels.

11. A display, comprising
a plurality of display layers that include a liquid crystal layer and a thin-film-transistor layer;
organic light-emitting diode backlight structures that are laminated to a surface of the plurality of display layers, wherein the organic light-emitting diode backlight structures provide backlight to the plurality of display layers;
at least one conductive via that electrically couples the organic light-emitting diode backlight structures to the thin-film-transistor layer; and
a polarizer layer interposed between the thin-film transistor layer and the organic light-emitting diode backlight structures, wherein the at least one conductive via passes through the polarizer layer.

12. The display defined in claim 11 wherein the organic light-emitting diode backlight structures include an extended edge portion that extends beyond an edge of the plurality of display layers.

13. The display defined in claim 12, further comprising conductive contacts on the extended edge portion.

14. The display defined in claim 13 wherein the extended edge portion is bent away from a plane defined by the plurality of display layers.

15. The display defined in claim 11 wherein the organic light-emitting diode backlight structures comprise a segmented organic light-emitting diode backlight unit.

16. The display of claim 11, wherein control signals from the thin-film-transistor layer control the organic light-emitting diode backlight structures.

17. A display, comprising:
a substrate having thin-film-transistor circuitry formed thereon;
organic emissive material on the substrate;
a layer of liquid crystal material, wherein the organic emissive material is interposed between the substrate and the layer of liquid crystal material;
thin-film transistor electrodes interposed between the layer of liquid crystal material and the organic emissive material;
a planarization layer interposed between the thin-film transistor electrodes and the organic emissive material;
a polarizer interposed between the organic emissive material and the planarization layer; and
at least one conductive via that couples conductive structures on the substrate to the thin-film-transistor electrodes.

18. The display defined in claim 17, wherein the thin-film-transistor electrodes are formed directly on the planarization layer.

19. The display defined in claim 18, further comprising an encapsulation layer formed over the organic emissive material.

20. The display defined in claim 19, further comprising a light polarizing layer interposed between the organic emissive material and the layer of liquid crystal material.

21. The display defined in claim 20 wherein the light polarizing layer is formed on the planarization layer.

22. A display comprising:
a liquid crystal display cell comprising an array of display pixels; and
an organic light-emitting diode backlight unit having a plurality of backlight pixels that share a common organic light-emitting diode layer and that provide white backlight to the entire array of display pixels, wherein each backlight pixel provides white backlight to a single corresponding display pixel in the array of display pixels, wherein each backlight pixel includes a plurality of color backlight sub-pixels and wherein, in combination, the plurality of color backlight sub-pixels in each backlight pixel are configured to generate the white backlight having a color temperature that is within a predetermined range of a desired color temperature.

23. The display defined in claim 22 wherein the desired color temperature comprises the color temperature of a standard illuminant.

24. The display defined in claim 23 wherein the predetermined range is between 6000K and 7000K.

25. A display comprising:
a liquid crystal display cell having an array of display pixels, wherein the liquid crystal display cell comprises a thin-film transistor layer having thin-film transistors on a substrate and a color filter layer with a plurality of color filter elements that have associated transmission peak wavelengths;
an organic light-emitting diode backlight unit having an organic light-emitting diode layer comprising thin-film transistors on an additional substrate that receive control signals from the thin-film transistor layer in the liquid crystal display cell, wherein the organic light-emitting diode layer includes a plurality of backlight pixels that provide backlight to the entire array of display pixels, wherein each backlight pixel includes a plurality of color backlight sub-pixels and wherein, in combination, the plurality of color backlight sub-pixels are configured to generate backlight having a spectrum that includes emission peaks at emission peak wavelengths that correspond to the transmission peak wavelengths of the color filter elements; and
a polarizer interposed between the liquid crystal display cell and the organic light-emitting diode layer, wherein the thin-film transistors on the additional substrate receive the control signals from the thin-film transistor layer in the liquid crystal display cell through a via that extends through the polarizer.

26. The display defined in claim 25, wherein at least one of the emission peak wavelengths is within 30 nanometers of the transmission peak wavelength of a corresponding one of the plurality of color filter elements.

27. The display defined in claim 25 wherein, for each backlight pixel, the plurality of color backlight sub-pixels comprises a first color backlight sub-pixel having a first width and a second color backlight sub-pixel having a second width and wherein the first width is larger than the second width.

28. The display defined in claim 27 wherein the first color backlight sub-pixel is a blue backlight sub-pixel.

* * * * *